US006294596B1

(12) United States Patent
Papalos et al.

(10) Patent No.: US 6,294,596 B1
(45) Date of Patent: Sep. 25, 2001

(54) SELF-DISPERSING CURABLE EPOXY RESINS, DISPERSIONS MADE THEREWITH, AND COATING COMPOSITIONS MADE THEREFROM

(75) Inventors: John G. Papalos, Ledgewood, NJ (US); Shailesh Shah, Dresher, PA (US); Reuben H. Grinstein, Tucson, AZ (US); Joseph L. Mulvey, Lansdale; Brian G. Jewell, North Wales, both of PA (US)

(73) Assignee: Henkel Corporation, Gulph Mills, PA (US)

(*) Notice: Subject to any disclaimer, the term of this patent is extended or adjusted under 35 U.S.C. 154(b) by 1310 days.

(21) Appl. No.: 08/529,127

(22) Filed: Sep. 15, 1995

Related U.S. Application Data

(63) Continuation-in-part of application No. 08/296,283, filed on Aug. 25, 1994, now abandoned, which is a continuation-in-part of application No. 08/173,455, filed on Dec. 27, 1993, now abandoned.

(51) Int. Cl.$^7$ .................................................. C08L 63/00
(52) U.S. Cl. .......................... 523/414; 523/404; 523/424; 525/486; 525/504; 528/96; 528/111
(58) Field of Search ..................... 523/414, 404, 523/424; 525/486, 504; 528/96, 111

(56) References Cited

U.S. PATENT DOCUMENTS

| | | | |
|---|---|---|---|
| 2,651,589 | 9/1953 | Shokal et al. | 154/140 |
| 2,705,223 | 3/1955 | Renfrew et al. | 260/18 |
| 2,811,495 | 10/1957 | Wittcoff et al. | 260/18 |
| 2,864,775 | 12/1958 | Newey | 260/2 |
| 2,899,397 | 8/1959 | Aelony et al. | 260/18 |
| 3,249,412 | 5/1966 | Kolek et al. | 65/3 |
| 3,301,804 | 1/1967 | Zors et al. | 260/29.2 |
| 3,366,600 | 1/1968 | Haberlin et al. | 260/47 |
| 3,486,925 | 12/1969 | Hoffman | 117/76 |
| 3,515,698 | 6/1970 | Mauz et al. | 260/75 |
| 3,538,184 | 11/1970 | Heer | 260/830 |
| 3,547,881 | 12/1970 | Mueller et al. | 260/47 |
| 3,634,348 | 1/1972 | Carter et al. | 260/18 |
| 3,639,344 | 2/1972 | Kinneman et al. | 260/47 |
| 3,931,109 | 1/1976 | Martin | 260/47 |
| 4,031,050 | 6/1977 | Jerabek | 260/29.2 |
| 4,033,917 | 7/1977 | Sekmakas et al. | 260/29.2 |
| 4,093,594 | 6/1978 | Anderson | 260/47 |
| 4,105,634 | 8/1978 | Hanson et al. | 526/65 |
| 4,113,684 | 9/1978 | Petrie | 260/29.2 |
| 4,116,900 | 9/1978 | Belanger et al. | 260/18 |
| 4,134,864 | 1/1979 | Belander | 260/18 |
| 4,137,140 | 1/1979 | Belanger | 204/18 |
| 4,139,510 | 2/1979 | Anderson | 260/18 |
| 4,182,831 | 1/1980 | Hicks | 528/103 |
| 4,246,148 | 1/1981 | Shimp et al. | 260/18 |
| 4,315,044 | 2/1982 | Elmore et al. | 427/386 |
| 4,420,574 | 12/1983 | Moriarity et al. | 523/404 |
| 4,420,606 | 12/1983 | Waddill | 523/111 |
| 4,423,166 | 12/1983 | Moriarity et al. | 523/414 |
| 4,423,170 | * 12/1983 | Waddill | 523/414 |
| 4,430,261 | 2/1984 | Schaeffer et al. | 260/404.8 |
| 4,533,254 | 8/1985 | Cook et al. | 366/176 |
| 4,608,405 | 8/1986 | DeGooyer | 523/404 |
| 4,608,406 | 8/1986 | Elliott | 428/418 |
| 4,728,384 | 3/1988 | Goel | 156/307.3 |
| 4,738,995 | 4/1988 | Kooijmans et al. | 523/404 |
| 4,810,535 | 3/1989 | McCollum et al. | 427/410 |
| 4,824,927 | 4/1989 | Dobbelstein et al. | 528/88 |
| 4,835,225 | 5/1989 | Massingill, Jr. et al. | 525/481 |
| 4,883,830 | 11/1989 | Kitabatake et al. | 523/414 |
| 4,886,867 | 12/1989 | Lin et al. | 528/111 |
| 4,937,275 | 6/1990 | Kooijams et al. | 523/404 |
| 4,992,516 | 2/1991 | Schipfer et al. | 525/526 |
| 5,026,743 | 6/1991 | Beresford et al. | 523/404 |
| 5,032,629 | 7/1991 | Hansen et al. | 523/414 |
| 5,034,434 | 7/1991 | Beresford et al. | 523/404 |
| 5,057,557 | 10/1991 | Teeybig et al. | 523/404 |
| 5,059,293 | 10/1991 | Sugishima et al. | 204/181 |
| 5,221,700 | 6/1993 | Gilbert et al. | 523/404 |
| 5,246,984 | 9/1993 | Darwem et al. | 523/404 |

OTHER PUBLICATIONS

"Water–Reducible Coatings via Epoxy Resin Modification with Jeffamine (Reg. TM) Ed–2001 and Jeffamilne (Reg TM) M–1000".

"Jeffamine® Polyoxypropyleneamine Curing Agents for Epoxy Resins", Texaco Chemical Co.

"Advanced Amline Technology for Superior Polymers", Texaco Chemical Co., 1992.

H. Lee and K. Neville, "Opoxy Polymers," *Encyclopedia of Polymer Science and Technology,* vol. 6, pp. 209–271, John Wiley and Sons, Inc., 1967.

*Encyclopedia of Polymer Science and Engineering,* John Wiley and Sons, New York, NY, vol. 6, pp. 340–361.

W.C. Griffith, "Emulsions", *Encyclopedia of Chemical Technology,* vol. 8, pp. 900–930, John Wiley and Sons, New York, NY, 1979.

* cited by examiner

*Primary Examiner*—Randy Gulakowski
(74) *Attorney, Agent, or Firm*—John E. Drach; John Daniel Wood; Daniel S. Ortiz

(57) ABSTRACT

A self-dispersing curable epoxy composition is prepared upon contacting an epoxy resin with a polyoxyalkyleneamine having a molecular weight of from about 3,000 to about 15,000 in a ratio of about 0.001 to 0.060 reactive equivalents of polyoxyalkyleneamine to about 1.0 reactive equivalents of epoxy resin. The self-dispersing curable epoxy resin forms an aqueous dispersion upon mixing with water. When cured, the dispersion is useful as a coating composition.

10 Claims, No Drawings

SELF-DISPERSING CURABLE EPOXY RESINS, DISPERSIONS MADE THEREWITH, AND COATING COMPOSITIONS MADE THEREFROM

CROSS-REFERENCE TO RELATED APPLICATIONS

This application is a continuation-in-part of U.S. Ser. No. 08/296,283, filed Aug. 25, 1994 now abandoned, which is a continuation-in-part of U.S. Ser. No. 08/173,455, filed Dec. 27, 1993 now abandoned, the disclosures of which are incorporated by reference herein.

FIELD OF THE INVENTION

The present invention relates to coating compositions made from aqueous epoxy dispersions. More specifically, this invention relates to self-dispersing curable epoxy resins, and to aqueous dispersions and coating compositions comprising the same.

BACKGROUND OF THE INVENTION

Epoxy resins have come into widespread use as components in coating compositions. Coatings which comprise cured epoxy resins are valued for their durability, chemical resistance, and excellent adhesion to a broad range of substrates. Particularly desirable from an environmental point of view are epoxy resins which may be applied to a substrate with either minimal or no release of volatile organic components. Toward this end, there has been much research directed to the development of aqueous dispersions and emulsions of epoxy resins.

One class of aqueous epoxy dispersions employs one or more additives, also known as dispersants or emulsifiers or surfactants, which are necessary to stabilize the epoxy resin in the dispersion or emulsion form. Representative examples include an aqueous epoxy dispersion as described in U.S. Pat. No. 3,301,804 (employing the reaction product of a boric acid ester derived from boric acid with both an alkylene glycol and a beta-dialkyl-substituted aminoalkanol as an emulsifier), U.S. Pat. No. 3,634,348 (employing a phosphate ester as an emulsifying agent), U.S. Pat. No. 3,249,412 (employing in combination a cationic emulsifying agent selected from the group consisting of imidazolines and amides and a non-ionic emulsifying agent), and Specialty Chemicals Bulletin SC-021 entitled "Water-Reducible Coatings via Epoxy Resin Modification with Jeffamine (Reg. ™) ED-2001 and Jeffamine (Reg. ™) M-1000" available from Texaco Chemical Company, Bellaire, Tex. It should be noted that while the low molecular weight amines described in this Texaco bulletin may be adequate for emulsifying a low molecular weight epoxy resin (e.g. DER 331 from Dow Chemical), the low molecular weight amines are not alone effective for emulsifying a higher molecular weight resin (e.g. an epoxy resin such as DER 331 that has been advanced with a polyhydric phenol such as bisphenol A).

Another example comes from the technical literature of Synthron Inc., Morgantown, N.C., which discloses the use of PROX-E-141, a diglycidyl ether of Pluronic (Reg. ™) F88 diol (an ethylene oxide—propylene oxide—ethylene oxide block copolymer available from BASF Performance Chemicals, Parsippany, N.J.) as a reactive dispersant for epoxy resins. PROX-E-141 can act as a dispersant for epoxy resin in water, but then will react along with the epoxy resin when exposed to an amine functional curing agent.

The use of an additive to provide stability to an aqueous epoxy dispersion is preferably avoided as such additives add additional cost, formulation complexity, and may potentially interfere with the performance of a coating derived from the aqueous epoxy dispersion.

It is known to prepare aqueous epoxy dispersions from self-emulsifying epoxy resins. For example, U.S. Pat. No. 4,315,044 describes a stable epoxy dispersion composition comprising (1) an aqueous medium; and (2) between about 50–70 weight percent of self-emulsifying epoxy resin which is the addition product of reactants comprising (a) 40–90 parts by weight of diglycidyl ether of dihydric phenol, (b) 5–35 parts by weight of dihydric phenol, and (c) 2–15 parts by weight of diglycidyl ether of polyoxyalkylene glycol, wherein the molecular weight of the epoxy resin is in the range between about 500–20,000. The dispersion can also contain 1–25 weight percent based on resin solids of a water-immiscible $C_8$–$C_{20}$ aliphatic monoepoxide reactive diluent.

U.S. Pat. No. 4,608,406 describes stable aqueous epoxy resin dispersions comprised of (1) an aqueous medium; and (2) between about 50 to about 70 weight percent of self-emulsifying epoxy resin which is the addition reaction product of (a) 40–90 parts by weight of a diglycidyl ether of a dihydric phenol; (b) 5–35 parts of a dihydric phenol; (c) 2–15 parts by weight of a diglycidyl ether of a polyoxyalkylene glycol; and (d) 2 to 15 parts by weight of an alkyl phenol-formaldehyde novolac resin wherein the molecular weight of the epoxy resin is in the range of about 1000 to about 20,000. The stable dispersions can be modified by the addition of about 1 to about 25 weight percent of an aliphatic monoepoxide reactive diluent. In an attempt to improve freeze-thaw stability, the stable aqueous epoxy resin dispersions can be modified by the addition of about 5–20 weight percent, based on resin solids weight, of a water-miscible solvent which, preferably, is a 2 to 8 carbon glycol or glycol ether.

There remains a need for further improvements in terms of the freeze-thaw resistance of aqueous epoxy resin dispersions, and in terms of the corrosion resistance and chemical resistance of coatings derived from aqueous epoxy resin dispersions which are adapted for application as industrial maintenance coating systems.

Accordingly, it is a primary object of this invention to provide a self-dispersing curable epoxy resin which may be dispersed in water without the necessity for an additive to stabilize the epoxy dispersion.

Another object of this invention is to provide aqueous dispersions of self-dispersing curable epoxy resins which exhibit long term stability under ambient storage conditions.

Yet another object of this invention is to provide coating compositions incorporating a self-dispersing curable epoxy resin, where the coating composition exhibits excellent properties when cured.

Other objects and advantages of the present invention shall become apparent from the accompanying description and examples.

SUMMARY OF THE INVENTION

It has been found that a self-dispersing curable epoxy composition can be prepared upon contacting an epoxy resin with a polyoxyalkyleneamine having a molecular weight of from about 3,000 to about 15,000 in a ratio of about 0.001 to 0.060 reactive equivalents of polyoxyalkyleneamine to about 1.0 reactive equivalents of epoxy resin.

The self-dispersing curable epoxy resin of the invention forms an aqueous dispersion upon mixing with water. When cured, films of the self-dispersing curable epoxy resin are useful as a coating composition.

DETAILED DESCRIPTION OF THE INVENTION

The self-dispersing curable epoxy resin formulation of the invention is prepared upon contacting (a) 1.0 reactive equivalents of an epoxy resin with (b) from about 0.001 to 0.060 reactive equivalents, preferably from about 0.008 to about 0.015 reactive equivalents of a polyoxyalkyleneamine having a molecular weight of from about 3,000 to about 15,000.

The Polyoxyalkyleneamine

The polyoxyalkyleneamine reactant comprises one or more amino-compounds where the amino-compound comprises both an amine group and a substantially water-soluble polyether chain. The polyoxyalkyleneamine reactant is soluble or at least partially soluble in water. Techniques to prepare suitable polyoxyalkyleneamine reactants are known in the art, and include reacting a hydroxyl group containing initiator with ethylene oxide and/or propylene oxide, followed by conversion of the resulting terminal hydroxyl group(s) to amine(s). Illustrative of the polyoxyalkyleneamine reactants employed in the invention are the Jeffamine (Reg. ™) brand of polyoxyalkyleneamines available from Texaco Chemical Company, Bellaire, Tex.

The preferred polyoxyalkyleneamines of this invention have the structural formula:

$R_1$—O—$R_2$—$CH_2CH(R_3)$—$NH_2$ wherein:

$R_1$ designates a monovalent organic radical selected from the group consisting of $C_1$ to $C_{12}$ aliphatic, alicyclic or aromatic hydrocarbons, and $R_2$ represents a polyoxyalkylene chain having the structural formula:

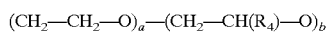

$(CH_2$—$CH_2$—$O)_a$—$(CH_2$—$CH(R_4)$—$O)_b$ wherein:

$R_4$ is a monovalent organic radical selected from the group consisting of $C_1$ to $C_4$ aliphatic hydrocarbons, 'a' designates a number of ethoxy groups ($CH_2$—$CH_2$—O), 'b' designates a number of monosubstituted ethoxy groups ($CH_2$—$CH(R_4)$—O) where the substitution of one monosubstituted ethoxy group is independent from the substitution of any other monosubstituted ethoxy group in the polyoxyalkylene chain, the sum of 'a' and 'b' is equal to or greater than 10 but less than or equal to 200, and where the sequence of ethoxy and monosubstituted ethoxy groups within a polyoxyalkylene chain may be completely random and/or there may be blocks of ethoxy and/or monosubstituted ethoxy groups, and $R_3$ designates H or a monovalent organic radical selected from the group consisting of $C_1$ to $C_4$ aliphatic hydrocarbons.

Preferred polyoxyalkyleneamines have $R_1$, $R_3$ and $R_4$ each equal to methyl, and either (i) a ratio of 'a' to 'b' of about 19:1 (e.g. a weight ratio of about 95% by weight ethoxy to about 5% by weight iso-propoxy), wherein the ethoxy and iso-propoxy groups are arranged substantially in two blocks and the molecular weight of the polyoxyalkyleneamine is from about 3,000 to about 4,000, or (ii) a random sequence of ethoxy and iso-propoxy groups wherein the ratio of 'a' and 'b' in the random sequence is about 7:3 (e.g. a weight ratio of about 70% by weight ethoxy to about 30% by weight iso-propoxy) and the molecular weight of the polyoxyalkyleneamine is from about 3,000 to about 4,000, or (iii) a ratio of 'a' to 'b' of about 9:1 (e.g. a weight ratio of about 90% by weight ethoxy to about 10% by weight iso-propoxy), wherein the ethoxy and iso-propoxy groups are arranged substantially in two blocks and the molecular weight of the polyoxyalkyleneamine is from about 5,000 to about 6,000, or (iv) a ratio of 'a' to 'b' of about 7:3 (e.g. a weight ratio of about 70% by weight ethoxy to about 30% by weight iso-propoxy), wherein the ethoxy and iso-propoxy groups are present in random sequence and the molecular weight of the polyoxyalkyleneamine is from about 5,000 to about 6,000, or (v) a ratio of 'a' to 'b' of about 9:1 (e.g. a weight ratio of about 90% by weight ethoxy to about 10% by weight iso-propoxy), wherein the ethoxy and iso-propoxy groups are arranged substantially in two blocks and the molecular weight of the polyoxyalkyleneamine is from about 9,000 to about 10,000 or (vi) a ratio of 'a' to 'b' of about 7:3 (e.g. a weight ratio of about 70% by weight ethoxy to about 30% by weight iso-propoxy), wherein the ethoxy and iso-propoxy groups are present in random sequence and the molecular weight of the polyoxyalkyleneamine is from about 9,000 to about 10,000.

The most preferred polyoxyalkyleneamines are the Jeffamine (Reg. ™) polyoxyalkyleneamines from Texaco Chemical Company, Bellaire Tex. According to Texaco, these polyoxyalkyleneamine are prepared by reacting methanol with ethylene oxide and propylene oxide followed by conversion of the resulting terminal hydroxyl group to an amine. The most preferred polyoxyalkyleneamine has an approximate molecular weight of 3,000 and a weight ratio of ethylene oxide to propylene oxide of about 19:1.

The Epoxy Resin

The epoxy resin used in the practice of this invention comprises one or more polyglycidyl ethers of polyhydric phenols having two (2) or more epoxide groups and one (1) or more six-carbon aromatized rings present in the molecule, as represented by the structural formula:

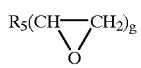

wherein $R_5$ represents a 'g' valent $C_6$–$C_{150}$ organic radical comprising at least one six-carbon aromatized ring (e.g. when g is 2, $R_5$ can be —$CH_2$—O—Ø—$C(CH_3)_2$—Ø—O—$CH_2$— or $R_5$ can be —$CH_2$—O—Ø—$CH_2$—Ø—O—$CH_2$— wherein Ø represents a phenyl group), and 'g' is equal to or greater than 2 but less than or equal to 6.

Techniques to prepare such epoxy resins are known in the art, and include reacting compounds having 2 or more hydroxyl groups with epichlorohydrin in the presence of a suitable catalyst. Suitable epoxy resins are commercially available from a variety of sources and include EPON (Reg. ™) epoxy resins from Shell Chemical Company, Houston, Tex., and DER (Reg. ™) or DEN (Reg. ™) epoxy resins from Dow Chemical Company, Midland, Mich.

Examples of suitable epoxy resins are:

I) Polyglycidyl and poly(beta-methylglycidyl) esters obtainable by reacting a compound having at least two carboxy groups in the molecule with epichlorohydrin or beta-methyl-epichlorohydrin, respectively. The reaction is advantageously carried out in the presence of bases. Examples of aromatic polycarboxylic acids which may be used include, for example, phthalic acid, isophthalic acid or terephthalic acid.

II) Polyglycidyl or poly(beta-methylglycidyl) ethers obtainable by reacting a compound having at least two free phenolic hydroxy groups with epichlorohydrin or beta-methyl-epichlorohydrin, respectively, under alkaline conditions, or in the presence of an acid catalyst and with subsequent alkali treatment.

The epoxy compounds of this type may be derived from mononuclear phenols, such as, for example, resorcinol or hydroquinone; or they are based on polynuclear phenols, such as, for example, bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl) propane, 2,2-bis(3,5-dibromo-4-hydroxyphenyl) propane, and from novolacs obtainable by condensation of aldehydes, such as formaldehyde, acetaldehyde, chloral or furfuraldehyde, with phenols, such as phenol, or with phenols that are substituted in the nucleus by halide atoms or $C_1$–$C_{18}$(preferably $C_1$–$C_9$) alkyl groups, such as, for example, 4-chlorophenol, 2-methylphenol or 4-tert-butylphenol, or by condensation with bisphenols, in the manner described above.

There are preferably used epoxy resins that have an epoxy content of from 2 to 10 equivalents/mole and that are glycidyl ethers or glycidyl esters of aromatic or alkylaromatic compounds. Especially preferred epoxy resins are polyglycidyl ethers of bisphenols, such as, for example, of 2,2-bis(4-hydroxyphenyl)propane (bisphenol A) or bis(4-hydroxyphenyl)methane (bisphenol F), or novolacs formed by reacting formaldehyde with a phenol. For reasons of cost and availability, the most preferred epoxy resins are polyglycidyl ethers based on bisphenol A.

Preferred epoxy resins have an epoxide equivalent weight of less than about 400 grams/equivalent, e.g. from about 100 grams/equivalent to about 350 grams/equivalent, more preferably from about 150 grams/equivalent to about 225 grams/equivalent, e.g. DER 331 available from Dow Chemical at about 182 grams/equivalent.

The Polyhydric Phenol

The reaction mixture may also contain a polyhydric phenol reactant, which reactant comprises one or more compounds each having a plurality of hydroxyl groups covalently bonded to one or more six-carbon aromatized rings. The reaction mixture need not, however, contain a polyhydric phenol reactant. The polyhydric phenol reactant may contain substituents such as alkyl, aryl, sulfido, sulfonyl, halo, and the like. The polyhydric phenol is represented by the structural formula:

wherein $R_6$ represents an 'h' valent $C_6$–$C_{50}$ organic radical comprising at least one six-carbon aromatized ring, and 'h' represents a number of phenolic hydroxyl groups where 'h' is equal to or greater than 2 but less than or equal to 6.

Techniques to prepare suitable polyhydric phenol compounds are known in the art. Suitable polyhydric phenol compounds are commercially available from Dow Chemical Company, Midland Mich., and Shell Chemical Company, Houston, Tex.

Illustrative of suitable polyhydric phenols are 2,2-bis(4-hydroxyphenyl)propane, 2,2-bis(3-bromo-4-hydroxyphenyl)-propane, 2,2-bis(3,5-dichloro-4-hydroxyphenyl)propane, 2,2-bis(3-chloro-4-hydroxyphenyl)propane, bis(4-hydroxyphenyl)-methane, bis(4-hydroxyphenyl)sulfone, bis(4-hydroxyphenyl)sulfide, resorcinol, hydroquinone, phenol-formaldehyde novolac resins, and the like. The most preferred dihydric phenols are 2,2-bis(4-hydroxyphenyl)propane (bisphenol A) and bis(4-hydroxyphenyl)methane (bisphenol F) for reasons of cost and availability.

The polyhydric phenol is preferably present in a ratio of reactive equivalents of the polyepoxide to reactive equivalent of the polyhydric phenol of from about 1:0.25 to 1:0.75.

The Self-Dispersing Curable Epoxy Resin

The self-dispersing curable epoxy resins of the invention may be prepared by reacting a polyoxyalkyleneamine with a polyhydric phenol and an epoxy resin. The structure and composition of the self-dispersing curable epoxy resin will depend on the identity of the polyoxyalkyleneamine, the identity of the epoxy resin, the identity of the polyhydric phenol and the relative ratio of the reactants.

The products of the above reaction are envisioned to be an extremely complex mixture of polymeric materials comprising two distinct groups. A simplified structure for each group of reaction products can be shown if it is assumed that the phenolic component is dihydric and the epoxy component is a diepoxide.

Structure [I]

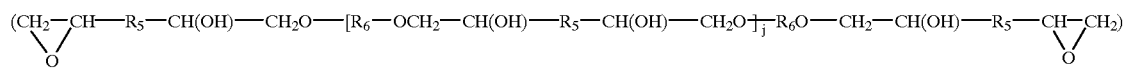

wherein

'j' indicates a number of repeating units, and is equal to or greater than zero (0) but less than or equal to twenty (20).

Structure [II]

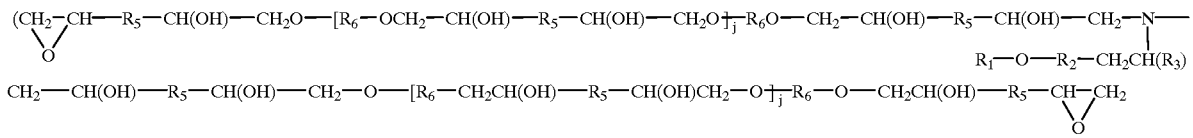

an all other variables are as defined above.

Organic Cosolvents

The self-dispersing curable epoxy resin of the present invention may be combined with a non-reactive, water-miscible, organic cosolvent. The cosolvent serves to reduce the viscosity of the self-dispersing curable epoxy resin. Preferred organic cosolvents include the alkyl ethers of monohydric and dihydric alcohols, where the alkyl group comprises $C_1$–$C_8$ linear or branched aliphatic or alicyclic chains. The choice of cosolvent can affect the pot-life of the self-dispersing curable epoxy resin. For example, for a given resin it may be possible to increase the pot-life by substituting for a cosolvent such as Ektasolve EP (Eastman Chemicals) with one of the following cosolvents (the greater increase being obtained in order): 1-methoxy-2-propyl acetate, methyl n-amyl ketone, or dipropylene glycol n-butyl ether.

Reactive Diluents

The preferred stable aqueous epoxy resin dispersions of the present invention are those which contain a water-immiscible $C_8$–$C_{20}$ aliphatic monoepoxide reactive diluent. The said monoepoxide component can contain alicyclic and aromatic structures, as well as halogen, sulfur, phosphorus, and other such heteroatoms. Suitable reactive diluents are available from CVC Specialty Chemicals, Inc., Cherry Hill, N.J.

Illustrative of monoepoxide reactive diluents are epoxidized unsaturated hydrocarbons such as decene and cyclohexene; glycidyl ethers of monohydric alcohols such as 2-ethylhexanol, dodecanol and eicosanol; glycidyl esters of monocarboxylic acids such as hexanoic acid; acetals of glycidaldehyde; and the like. The preferred reactive diluent is glycidyl ether of monohydric $C_8$–$C_{10}$ aliphatic alcohols.

The presence of a water-immiscible $C_8$–$C_{20}$ aliphatic monoepoxide reactive diluent in an aqueous epoxy resin dispersion has significant beneficial effects in addition to modifying the viscosity of the dispersion. For example, the said water-immiscible reactive diluent appears to coat the particles of epoxy resin solids and thereby provide the aqueous dispersion with improved shear, freeze-thaw resistance, shelf viscosity stability, and paint gloss.

Also, since the reactive diluent is epoxy functional, it becomes chemically bonded into the film which is formed during the subsequent room temperature curing of the aqueous dispersion composition after it has been blended with a curing agent and coated on a surface. The total quantity of reactive diluent contributes to the calculated proportion of non-volatiles in the dispersion composition.

Preparation of the Self-Dispersing Curable Epoxy Resin

In preparing the self-dispersing curable epoxy resins of this invention, an advanced epoxy resin is first prepared by combining the epoxy resin reactant and the polyhydric phenol reactant, (typically in a vessel under an inert, e.g. dry nitrogen gas, atmosphere) heating the mixture in the presence of a catalyst, e.g., potassium hydroxide, triphenyl phosphine, benzyl dimethylamine and the like, to a temperature of about 150° C. with stirring. An exothermic reaction will then occur, and cooling is applied to maintain the reaction temperature at about 150–1 60° C. The mixture is maintained at about 160° C. for about one hour subsequent to the conclusion of the exothermic reaction, followed by heating to 190° C. The reaction is maintained at 190° C. for about 15 minutes in order to drive the reaction to completion, then cooled to about 160° C., whereupon a small amount of a water-soluble organic solvent is added prior to cooling, e.g. to about 125° C. The self-dispersing epoxy resin is prepared by combining the advanced resin and a polyoxyalkyleneamine and heating the mixture at an elevated temperature, e.g. from about 110° C. to about 150° C., typically about 125° C., holding the mixture at temperature for an extended time, e.g. from about 30 minutes to about 3 hours, typically about 1 hour, and then discharging the self-dispersing curable epoxy resin from the reactor.

Preparation of an Aqueous Dispersion of the Self-Dispersing Curable Epoxy Resin

The aqueous epoxy dispersion of the invention is prepared by charging the self-dispersing curable epoxy resin to a reaction vessel, then heating the resin to about 50–100° C. with stirring. Water is gradually added to the self-dispersing curable epoxy resin while the temperature is allowed to drop to about 50° C. During this period, the water in oil dispersion is formed and then inverts to an oil in water dispersion. After inversion, additional water may be added as well as reactive diluent in the form of a $C_8$–$C_{10}$ alcohol mono-glycidyl ether.

The particle size of the oil phase in the aqueous dispersion can be modified by physical techniques to reduce the particle size. The particle size reduction is preferably accomplished by subjecting an aqueous dispersion of the precipitate to high shear, e.g. in a homogenizer such as that disclosed in U.S. Pat. No. 4,533,254 (Cook et al.), the disclosure of which is incorporated herein by reference, and commercially available as MICROFLUIDIZER™ from Microfluidics Corporation, Newton, Mass. Homogenizers are discussed in W. C. Griffin, "Emulsions", *Encyclopedia of Chemical Technology*, Vol. 8, pp. 900–930 (Kirk-Othmer, eds., John Wiley & Sons, Inc., New York, N.Y., 3d ed., 1979), the disclosure of which is incorporated herein by reference.

The aqueous dispersion of self-dispersing resin will typically exhibit excellent chemical and physical stability over an extended shelf-life, e.g. of from five to six months. As an example of the chemical stability, the epoxide equivalent weight (EEW) of the aqueous dispersion of self-dispersing resin should remain essentially constant, e.g. should show no trend of increasing molecular weight, over a period of at least one month from the preparation of the aqueous dispersion.

Epoxide equivalent weight can be determined by differential titration with perchloric acid using crystal violet as an indicator (e.g. a first sample is titrated with 0.1 N perchloric acid to an endpoint that shows the first sight of green color from the crystal violet indicator, the amine equivalent weight of the dispersion is calculated from this titration, a second sample is mixed with excess tetraethylammonium bromide and titrated with 0.1 N perchloric acid to a green endpoint that persists for at least 30 seconds, total epoxide and amine equivalents are calculated from this titration, and the epoxide equivalent weight is calculated as the difference).

As an example of physical stability, the resin should not display layer formation for a period of at least one month from the preparation of the aqueous dispersion, i.e. there should be no formation of a macro-observable water phase as a layer separate from the dispersed resin phase.

While not wishing to exclude any other components unnecessarily, it is noted that the use of volatile acids to salt the amine-epoxy adduct are not needed and so should be excluded from the adduct, any aqueous dispersion of self-dispersing resin prepared therewith, and/or any coating composition prepared from such self-dispersing resin. Further, it is believed that the selection of components is so important to the performance of the curing agent that other components which would affect the essential attributes of the self-dispersing resin, or coating compositions prepared therefrom, should be excluded. The skilled artisan will, with the aid of the following description, be able to determine whether a particular component in a particular amount will affect the attributes of the self-dispersing resin in an essential manner, i.e. will prohibit its use to prepare a protective coating when cured.

Coating Compositions Comprising an Aqueous Dispersion of the Self-Dispersing Curable Epoxy Resin The coating composition of the invention is prepared by combining the aqueous epoxy dispersion with a suitable hardening agent. The coatings are tack-free after 45 minutes and have excellent film properties. An aqueous epoxy resin paint composition of the present invention may further contain additives conventionally employed in coating technology, such as organic pigments, inorganic pigments, surfactants, thickeners, and the like.

A room temperature curable water-borne coating composition is prepared by admixing a stable epoxy dispersion composition as described above with an epoxy-interacting curing vehicle, such as a polyamine curing agent. The ratio of active amino hydrogens to epoxy groups in the admixture is in the range of from 0.5:1 to 2:1 and, preferably, is in the range between about 0.8:1 to 1.5:1. For purposes of industrial maintenance paint compositions, the amino hydrogens must be sufficiently reactive to effect crosslinking interaction with the epoxy groups at ambient temperatures.

Suitable polyamine curing agents are those which are soluble or dispersible in water and which contain more than 2 active hydrogen atoms per molecule. Examples of such curing agents are alkylene polyamines represented by the formula:

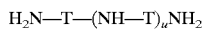

wherein 'T' is an alkylene radical containing 2 to 6 carbon atoms and 'u' is equal to or greater than zero (0) but less than or equal to five (5). Such alkylene polyamines include ethylene diamine, diethylene triamine, triethylene tetramine, tetraethylene pentamine, pentaethylene hexamine, propylene diamine, dibutylene triamine, hexamethylene diamine, and the like.

Other polyamine curing agents that can be employed in the practice of this invention are the polyamido amines, which are reaction products of alkylene polyamines and fatty acids. Such polyamidoamines are well known in the art and are described in U.S. Pat. Nos. 2,705,223, 2,811,495 and 2,899,397, which patents are hereby incorporated by reference. Other polyamine curing agents are the adducts of polyamines and epoxy compounds such as those described in U.S. Pat. Nos. 2,651,589, 2,864,775 and 4,116,900, which patents are hereby incorporated by reference.

Examples of useful curing agents also include those disclosed in U.S. patent application Ser. No. 08/085,861, filed on Jun. 30, 1993, entitled "Curing Agents for Aqueous Epoxy Resins", by Jason Chou et al., the disclosure of which is incorporated herein by reference. These epoxy curing agents comprise the reaction product of reactants consisting essentially of an alkylene polyamine having less than about 12 carbon atoms, an aromatic mono-glycidyl ether having less than about 18 carbon atoms, and a diglycidyl ether of an aromatic diol having an average degree of oligomerization of less than about 3.5, wherein the ratio of primary amine equivalents of said alkylene polyamine to the total epoxide equivalents of said aromatic glycidyl ether and said diglycidyl ether of an aromatic diol is not essentially less than one, and the ratio of epoxide equivalents of said aromatic mono-glycidyl ether to epoxide equivalents of said diglycidyl ether of an aromatic diol is greater than one.

In addition to the amine curing agent, a curing accelerator can be included in the coating composition. Such an accelerator will serve to reduce the time for the coating to become tack-free. Useful accelerators for amine curing agents include tertiary amines, e.g. N,N'-bis(dimethylaminopropyl) urea.

Other curing agents can be used in the composition of this invention, particularly when the coatings made from the compositions are heated to effect a cure. Examples of such additional curing agents are the aminoplast and phenolplast resins. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Aldehydes include formaldehyde, acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxymethylol urea, butylated polymeric urea-formaldehyde resins, hexamethoxymethyl melamine, methylated polymeric melamineformaldehyde resins and butylated polymeric melamine-formaldehyde resins.

Phenolplast resins are the reaction products of phenols and aldehydes which contain reactive methylol groups. These compositions can be monomeric or polymeric in nature depending on the molar ratio of phenol to aldehyde used in the initial condensation reaction. Examples of suitable phenols are phenol, o, m or p-cresol, 2,4-xylenol, 3,4-xylenol, 2,5-xylenol, cardanol, p-tert-butyl phenol, and the like. Useful aldehydes are formaldehyde, acetaldehyde and propionaldehyde. Particularly useful phenolplast resins are polymethylol phenols wherein the phenolic group is etherified with an alkyl, e.g., methyl or ethyl, group.

Other epoxy resin curing agents may also be useful, e.g. catalytic curing agents: Lewis bases (such as tertiary amines), Lewis acids (such as boron trifluoride), cationic curing agents (such as aryldiazonium salts, diaryliodinium salts, onium salts of Group Via elements, especially sulfur) and reactive curing agents: mercaptans, isocyanates, carboxylic acids, and acid anhydrides. Curing agents for epoxy resins in general are discussed in the *Encyclopedia of Polymer Science and Engineering*, vol. 6, pp. 340–361 (John Wiley & Sons, Inc., N.Y., N.Y., 1986), the disclosure of which is incorporated by reference.

The following examples are further illustrative of the present invention. The reactants and other specific ingredients are presented as being typical, and various modifications can be derived in view of the foregoing disclosure within the scope of the invention.

EXAMPLES

Example 1A
Preparation of Self-Dispersing Resin (SDR)

Into a 250 mL reaction flask equipped with heating mantle, nitrogen line, cooling condenser, thermometer and stirring means is charged 66.4 grams (0.348 equivalents) of the diglycidyl ether of bis-phenol A, and 19.6 grams (0.172 equivalents) of bis-phenol A which are heated to melt at 95° C. Then 0.15 grams of triphenyl phosphine is added.

The reaction mixture is heated slowly to 150° C. with stirring whereupon an exothermic reaction is observed. Cooling is immediately applied to maintain the reaction temperature between 150° C. and 160° C. After the exothermic reaction subsides, the reaction mixture is maintained at 160° C. for an additional hour followed by a 15 minute period at 190° C. The reaction mixture is then cooled to 160° C. and 14 grams of propyl cellosolve is added which immediately begins refluxing. The reaction mixture is cooled to 125° C. and 10.32 g of a polyoxyalkylenamine of the Jeffamine type, available from Texaco as experimental amine No. 6940-20, now Huntsman Chemical, is added. The reaction mixture is heated at 125–130° C. for one hour. It then cooled to 100° C. and analyzed. The resulting SDR should be about 88% solids in propyl cellosolve and should have an equivalent weight (EEW) about 617 (solid) and 0.07 meq/g total amine.

Example 1B
Preparation of Self-Dispersing Resin (SDR)

Example 1A is repeated except 6.0 g of a polyoxyalkylenamine of the Jeffamine type having an EO/PO ratio of 95/5 and molecular weight of 3,000, available from Texaco as experimental amine No. 6940-20, now Huntsman Chemical, is used. The resulting SDR should be about 87% solids in propyl cellosolve and should have an EEW of 546 (based on solids).

Example 1C
Preparation Self-Dispersing Resin (SDR)

Into a similar reactor as described in Example 1A, is charged 8.8 g propyl cellosolve which is heated to 90° C. Then 53.0 g epoxy resin DER-662 (Dow Chemical) is charged and dissolved. When a clear solution is obtained 3.7 g of a polyoxyalkylenamine of the Jeffamine type, available from Texaco as experimental amine No. 6940-20, now Huntsman Chemical, is added and reaction mixture is heated at 125–130° C. for one hour. It is then cooled to 100° C. and the product is analyzed. The product should be 87% solids in propyl cellosolve and should have an EEW of 759.0.

Example 2A
Preparation of Water-Borne Dispersion

Into a 500 mL reaction flask equipped with a stirrer, heating mantle, nitrogen line, cooling condenser and thermometer is charged 112 grams of the self-dispersing resin (SDR) prepared according to Example 1 A. The resin is heated to 100° C. whereupon 16.5 grams water are added gradually with stirring over a thirty minute period while the temperature drops to about 55° C. Then an additional 48 grams of water is added as the temperature is brought to 70° C. over twenty minutes. At 70° C. there is added 2 grams of water, followed by stirring for twenty minutes and then by 3 grams of water. The resulting water in oil dispersion is stirred for 45 minutes while it cools to 45° C., and thereafter is in the form of an oil-in-water dispersion. After the inversion is complete, 2.0 grams of $C_8$–$C_{10}$ alcohol monoglycidyl ether from CVC Specialty Chemicals Corporation is added as a reactive diluent. Then 36.3 grams water is added at 50° C. over a one hour period. The resulting water-borne dispersion should contain 56% resin solids in water/propyl cellosolve (82/18) solvent. The particle size of this dispersion should be about 0.50 microns.

Example 2B
Preparation of Water-Borne Dispersion

The procedure outlined in Example 2A is repeated except the SDR in Example 1 B is used. The resulting water-borne dispersion should be 56% resin solids in water/propyl cellosolve (82/18) solvent.

Example 2C
Preparation of Water-Borne Dispersion

The procedure outlined in Example 2A is repeated except the SDR in Example 1C is used. The resulting water-borne dispersion should be 56% resin solids in water/propyl cellosolve (82/18) solvent. The properties of these dispersions are given in the following table:

PROPERTIES OF DISPERSIONS

| Dispersion | Viscosity CPS/25° C. | Stability at 50°/4 weeks | Particle Size (Microns) | Film |
|---|---|---|---|---|
| 2A | 5,000 | S | 0.335 | P |
| 2B | 1,300 | S | 0.675 | P |
| 2C | 1,100 | S | 1.67 | P |

Example 3
Preparation of Coating Composition

Into a 25 mL plastic cup is charged 12.4 g (56% solids) of the water-borne dispersion prepared according to Example 2A followed by an equal equivalent amount (2 g) of epoxy curing agent available as 8290 by HiTech (a modified diethylene triamine with a hydrogen equivalent weight of 163). Sufficient water is then added to bring the mixture to a spreadable consistency. The epoxy dispersion/curing agent blend is aged for 10 minutes then a film casting is produced by drawing the blend down on pre-sanded TRU COLD cold rolled steel panel (3×6×0.32 inches) using a #34 wire wound steel rod. The film was tack free after 45 minutes. The physical properties of the coating composition were measured after the film had air dried at room temperature for 28 days. The procedure was separately repeated for the dispersions of Examples 2B and 2C. The films exhibited acceptable coating properties.

We claim:

1. A self-dispersing curable epoxy resin composition comprising the addition product of reactants comprising an epoxy resin and a polyoxyalkylene monoamine having a number average molecular weight of from about 3,000 to about 15,000 in a ratio of about 0.001 to 0.060 reactive equivalents of polyoxyalkylene monoamine to about 1.0 reactive equivalent of epoxy resin.

2. The composition as claimed in claim 1 wherein said polyoxyalkylene monoamine is comprised predominantly of ethyleneoxy groups.

3. The composition as claimed in claim 1 wherein from about 70% to about 95% by weight of the oxyalkylene groups of said polyoxyalkylene monoamine are ethyleneoxy groups.

4. The composition as claimed in claim 1 wherein said polyoxyalkylene monoamine has the structural formula:

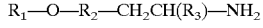

wherein:
  $R_1$ designates a monovalent organic radical selected from the group consisting of $C_1$ to $C_{12}$ aliphatic, alicyclic or aromatic hydrocarbons, and
  $R_2$ represents a polyoxyalkylene chain having the structural formula:

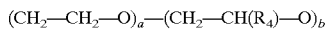

wherein:
  $R_4$ is a monovalent organic radical selected from the group consisting of $C_1$ to $C_4$ aliphatic hydrocarbons, 'a' designates a number of ethoxy groups ($CH_2$—$CH_2$—O), 'b' designates a number of monosubstituted ethoxy groups ($CH_2$—$CH(R_4)$—O) where the substitution of one monosubstituted ethoxy group is independent from the substitution of any other monosubstituted ethoxy group in the polyoxyalkylene chain, the sum of 'a' and 'b' is greater than 10 but less than or equal to 200, and where the sequence of ethoxy and monosubstituted ethoxy groups within a polyoxyalkylene chain may be completely random and/or there may be blocks of ethoxy and/or monosubstituted ethoxy groups, and $R_3$ designates H or a monovalent organic radical selected from the group consisting of $C_1$ to $C_4$ aliphatic hydrocarbons.

5. The composition as claimed in claim 1 wherein said epoxy resin has an epoxide equivalent weight of less than about 400 grams/equivalent.

6. The composition as claimed in claim 1 wherein said epoxy resin has an epoxide equivalent weight of from about 100 grams/equivalent to about 350 grams/equivalent.

7. The composition as claimed in claim 1 wherein said epoxy resin has an epoxide equivalent weight of from about 150 grams/equivalent to about 225 grams/equivalent.

8. The composition as claimed in claim 1 further comprising between about 20–80 weight percent of a liquid phase comprising between 50 and 100 weight percent water and between 0 and 50 weight percent of a water-soluble organic cosolvent, and about 80–20 weight percent of said self-dispersing curable epoxy dispersion composition.

9. A coating composition comprising a curable self-dispersing epoxy resin as defined in claim 1.

10. The method of making a self-dispersing aqueous epoxy resin composition comprising reacting (a) an epoxy resin with (b) a polyoxyalkylene monoamine having a number average molecular weight of from about 3,000 to about 15,000 in a ratio of about 0.001 to 0.060 reactive equivalents of polyoxyalkylene monoamine to about 1.0 reactive equivalents of epoxy resin to form a self-dispersing epoxy resin and dispersing the self-dispersing epoxy resin on a liquid comprising water.

* * * * *